United States Patent [19]

Sugiura et al.

[11] Patent Number: 4,618,219
[45] Date of Patent: Oct. 21, 1986

[54] ZOOM LENS

[75] Inventors: Muneharu Sugiura; Kazuo Fujibayashi; Sadahiko Tsuji, all of Kanagawa, Japan

[73] Assignee: Canon Kabushiki Kaisha, Tokyo, Japan

[21] Appl. No.: 581,953

[22] Filed: Feb. 21, 1984

[30] Foreign Application Priority Data

Feb. 24, 1983 [JP] Japan .................................. 58-29916

[51] Int. Cl.$^4$ ............................................. G02B 15/14
[52] U.S. Cl. .................................................... 350/427
[58] Field of Search ........................ 350/423, 427, 428

[56] References Cited

U.S. PATENT DOCUMENTS 3,659,921  5/1972  Hirose et al. ..................... 350/427

FOREIGN PATENT DOCUMENTS 3201700  8/1982  Fed. Rep. of Germany ...... 350/415
0019709  2/1982  Japan .

Primary Examiner—John K. Corbin
Assistant Examiner—Rebecca D. Gass
Attorney, Agent, or Firm—Toren, McGeady, Stanger, Goldberg & Kiel

[57] ABSTRACT

The disclosed zoom lens includes, from front to rear, a first lens component of positive power for focusing the lens, a second lens component of negative power for varying magnification power, a third lens component of negative power for compensating for the image shift resulting from the change of magnification power, and a fourth lens component of positive power for forming an image. The second lens component includes, from front to rear, a negative meniscus-shaped lens having a strong refracting rear surface, and another negative mensicus-shaped lens having a strong refracting front surface and a cemented surface of forward convexity. A front group of the fourth component includes, from front to rear, a bi-convex lens having a rear surface of strong curvature, another bi-convex lens having a front surface of strong curvature, a lens of negative power having a front surface of strong curvature and a lens of positive power having a front surface of strong curvature. The second group of the fourth component includes, from front to rear, a bi-concave lens having a rear surface of strong curvature, a bi-convex lens having a rear surface of strong curvature, and another bi-convex lens having a front surface of strong curvature. This permits a compact lens with good correction throughout the zooming range.

4 Claims, 12 Drawing Figures

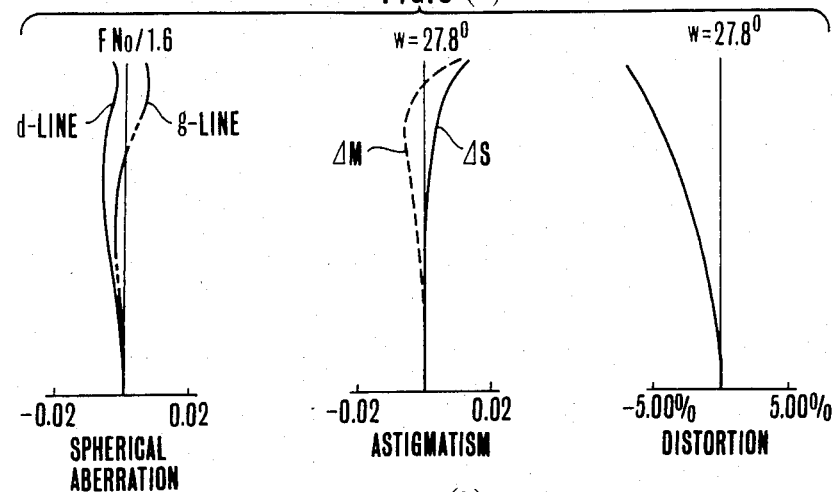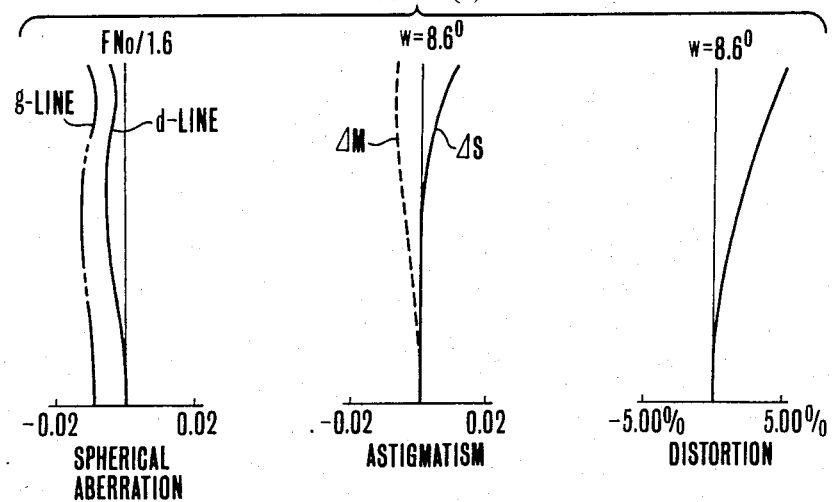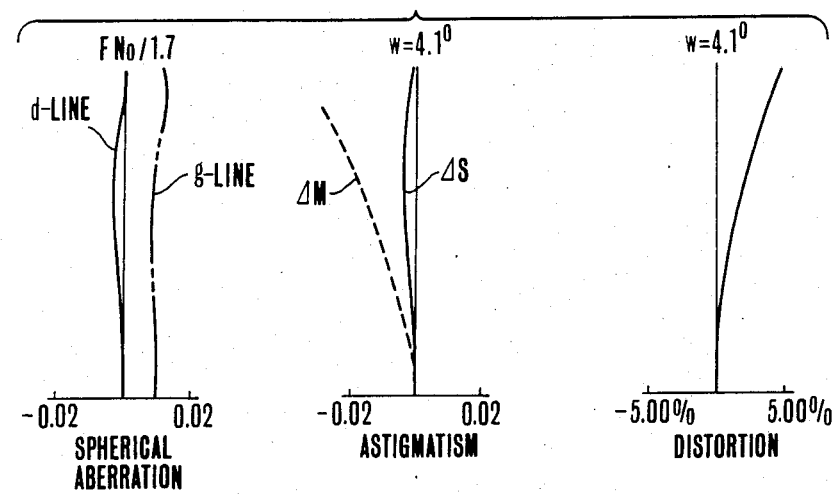

ZOOM LENS

BACKGROUND OF THE INVENTION

1. Field of the Invention

This invention relates to zoom lenses, and more particularly to such zoom lenses suited for video cameras.

2. Description of the Prior Art

Since the image pickup element of a video camera has a low sensitivity, the speed of the camera's objective lens should be fast and, in order to assist in reducing the size and weight of the camera as a whole, the physical length of the objective lens should be short. Another demand on the objective lens arises from the fact that a video camera may employ a stripe filter with single-tube type color image pickup device, or CCD imaging plate as the image pickup element. In such a camera deviation of the incident light on the stripe filter from an almost perpendicular direction results in a mixture of colors. Thus it is necessary to construct the objective lens in the form of a telecentric optical system.

In the present state of the art of zoom lenses, shortening of the entire lens system in the longitudinal direction is achieved by reducing the total axial movement of the variator. A most effective method for such a purpose is strengthening the refractive power of each of the lens members forming the variator. However the increase in the refractive power calls for imparting a stronger curvature to each of the lens surfaces in the variator. In zoom lenses this results in extreme difficulty of stabilizing good correction of spherical aberration, coma and distortion throughout the entire zooming range.

That is, when the prior art rules of zoom lens constructions are applied to objective lenses for video cameras to fulfill the above-stated requirements, high grade imaging performance becomes very difficult to achieve. Poor correction of spherical aberration, coma and distortion due to reduction of size, decreases the contrast and deforms the image.

An example of a zoom lens usable with a video camera is the one disclosed in Japanese Laid-Open Patent Application No. SHO 57-19707 of Feb. 2, 1982.

SUMMARY OF THE INVENTION

With the foregoing in mind, an object of the present invention is to provide a zoom lens having an F-number of about 1.6 and a physical length less than 1.7 times the focal length of the entire system when in the telephoto setting and constructed in the form of a telecentric optical system, while still permitting achievement of good stability of aberration correction throughout.

BRIEF DESCRIPTION OF THE DRAWINGS

FIGS. 6(a), 6(b) and 6(c) are graphic representations of the various aberrations of the lens of FIG. 3.

DETAILED DESCRIPTION OF THE PREFERRED EMBODIMENTS

Figure 1:
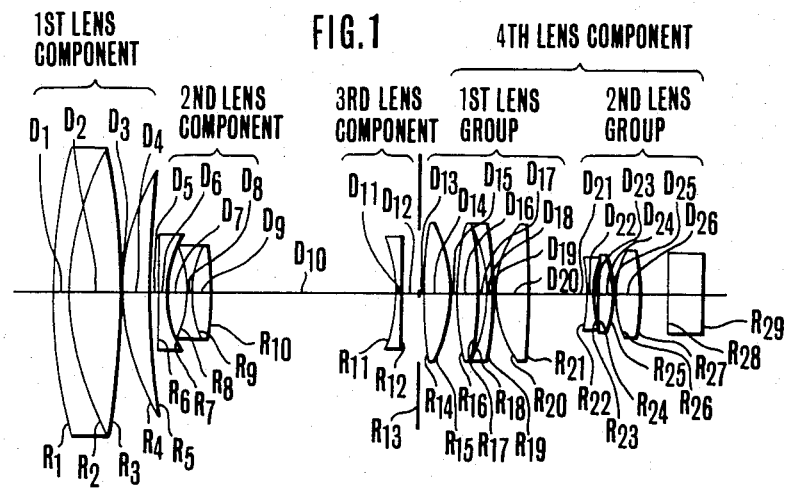
FIG. 1 is a lens block diagram of a specific embodiment 1 of the present invention.

The zoom lens of the present invention includes, from front to rear, a first lens component having a positive refractive power for focusing the lens, a second lens component having a negative refractive power for varying the magnification power, a third lens component having a negative refractive power for compensating for the image shift resulting from the change of the magnification power, and a fourth lens component having a positive refractive power for forming an image of an object. The second lens component includes, from front to rear, a negative meniscus-shaped singlet with its rear surface of strong curvature, and a negative meniscus-shaped doublet with its front surface of strong curvature and its cemented surface convex toward the front. The fourth lens component includes, from front to rear, first and second lens groups, the first lens group including, from front to rear, a bi-convex first singlet with its rear surface of strong curvature, a bi-convex second singlet with its front surface of strong curvature, a third singlet having a negative refractive power with its front surface of strong curvature, and a fourth singlet having a positive refractive power with its front surface of strong curvature, and the aforesaid second lens group including from front to rear, a bi-concave first singlet with its rear surface of strong curvature, a bi-convex second singlet with its rear surface of strong curvature, and another bi-convex or third singlet with its front surface of strong curvature.

Such general rules of construction for all constituent elements set forth the principle of construction of the zoom lens of the invention. By employing these rules of construction, a good compromise between the requirements of increasing the lens speed while shortening the physical length of the entire system and of well correcting aberrations is achieved.

According to the present invention, a zoom lens of such general type is given the following additional conditions. That is, letting $RII_i$ denotes the radius of curvature of the i-th lens surface counting from front in the aforesaid second component; $DII_i$ the i-th lens thickness or air space; $fII$ the focal length of the second component, $RIV_i$ the radius of curvature of the i-th lens surface counting from front, $DIV_i$ the i-th lens thickness or air space; and $fW$ and $fT$ the shortest and longest focal lengths of the entire system, (1) $5.7 < |fT/fII| < 6.1$
(2) $0.18 < RII2/fT < 0.22$
(3) $1.4 < |RIV3/RIV5| < 1.95$ ($RIV3 < 0$, $RIV5 < 0$)
(4) $1.5 < RIV7/fW < 1.9$
(5) $1.15 < RIV10/fw < 1.3$
(6) $0.07 < DIV4/fW < 0.25$
(7) $0.95 < DIV8/fW < 1.35$
(8) $0.12 < DIV10/fW < 0.18$ are satisfied.

If a zoom lens of the general type described above is constructed so that the above-stated conditions are all satisfied, it become possible to improve the state of correction of aberrations despite the zoom lens, while taking the form of a telecentric optical system, being faster in speed more compact than hitherto.

Each of the above-state conditions has the following purposes.

Condition () serves to shorten the physical length of the entire lens system. When the upper limit is exceeded, the total axial movement of the second lens component increases, thereby rendering difficult the shortening of the physical length. When the lower limit is exceeded, the refractive power of the second lens component becomes too large easily to provide good correction of spherical aberration and astigmatism.

Condition (2) is to reduce the diameter of the front lens component with the limitation of the range of variation of distortion to a minimum. When the upper limit is exceeded, the diameter of the front component becomes large. When the lower limit is exceeded, the variation of distortion with zooming is increased objectionably.

Condition (3) serves to well correct spherical aberration. When the upper limit is exceeded, an over-correction of spherical aberration results. When the lower limit is exceeded, it becomes under-corrected.

Condition (4) serves to converge the light bundle with good efficiency without causing production of unduly large spherical aberration. When the upper limit is exceeded, the converging effect becomes poor, calling for an increase in the physical length. When the lower limit is exceeded, very large spherical aberration is produced.

Condition (5) is to allow for construction of the telecentric optical system in compact and good form. When the upper limit is exceeded, the physical length of the lens system must be longer or no telecentric optical system could be formed. When the lower limit is exceeded, very large outward coma is produced which is difficult to correct well by any construction of other lenses.

Condition (6) is to correct spherical aberration and astigmatism. When the upper limit is exceeded, spherical aberrations of higher order are produced. When the lower limit is exceeded, the astigmatism becomes large.

Condition (7) represents a proper range of air space between the first and second groups in the fourth component. When the values of the factors fall within this range, both on-axis and off-axis aberrations can be well corrected in good balance, and the telecentric optical system can be formed to good proportion. When the upper limit is exceeded, the on-axis aberrations such as spherical aberration become difficult to correct. When the lower limit is exceeded, the off-axis aberrations such as astigmatism and come become difficult to correct, and the construction of any telecentric optical system becomes difficult to perform.

Condition (8) serves to form a telecentric optical system in good proportion while suppressing production of aberrations. When the upper limit is exceeded, very large coma and distortion are produced. When the lower limit is exceeded, the construction of a telecentric optical system becomes difficult.

Specific numerical examples of the zoom lens of the invention shown are below. In a table of numerical data for each specific lens, Ri denotes the radius of curvature of the i-th lens surface counting from front, Di the i-th lens thickness of air space counting from front, Ni and νi the refractive index and Abbe number of the glass of the i-th lens element counting from front respectively.

Figure 2:
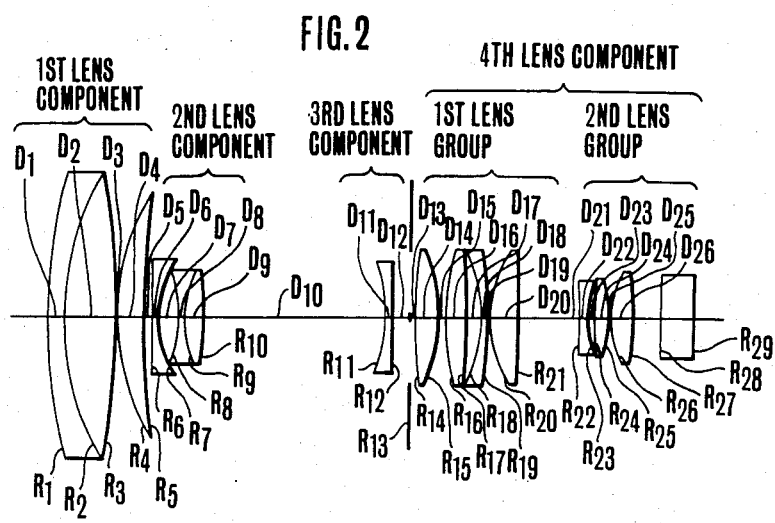
FIG. 2 is a lens block diagram of another specific embodiment 2 of the present invention.
Figure 3:
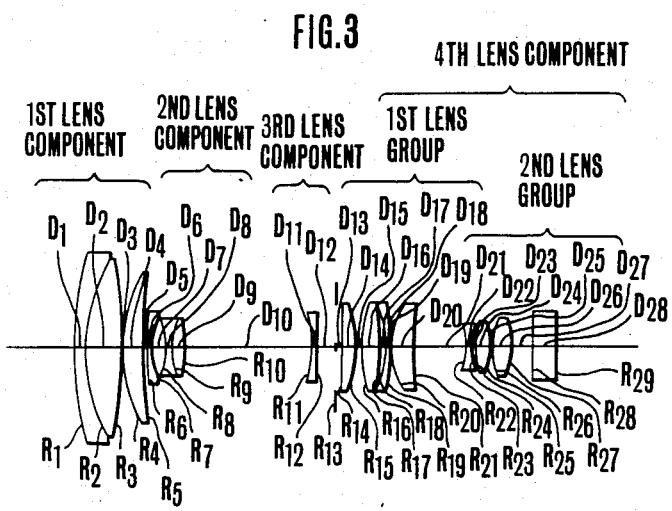
FIG. 3 is a lens block diagram of another specific embodiment 3 of the present invention.
Figure 4A:
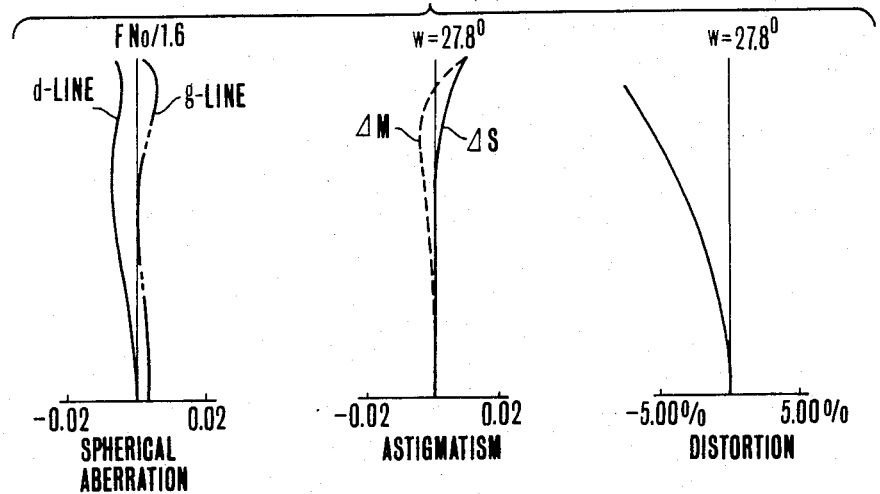
FIGS. 4(a), 4(b) and 4(c) are graphic representations of the various aberrations of the lens of FIG. 1.
Figure 4B:
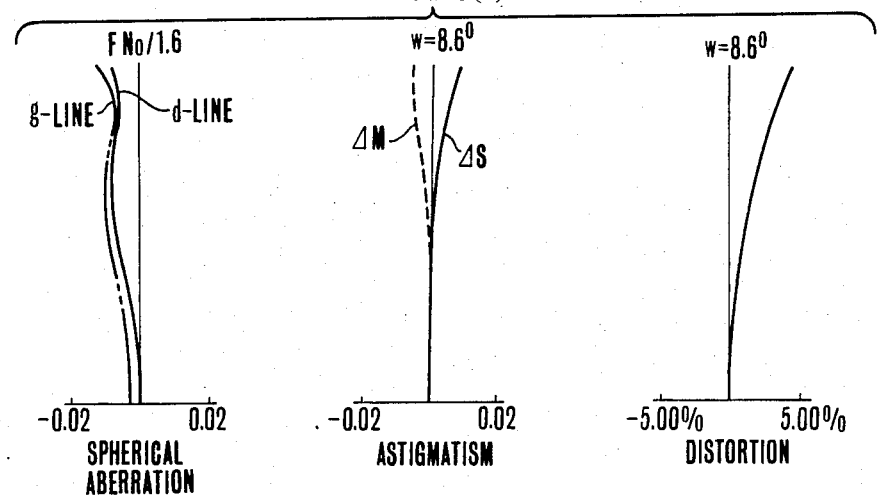
Figure 4C:
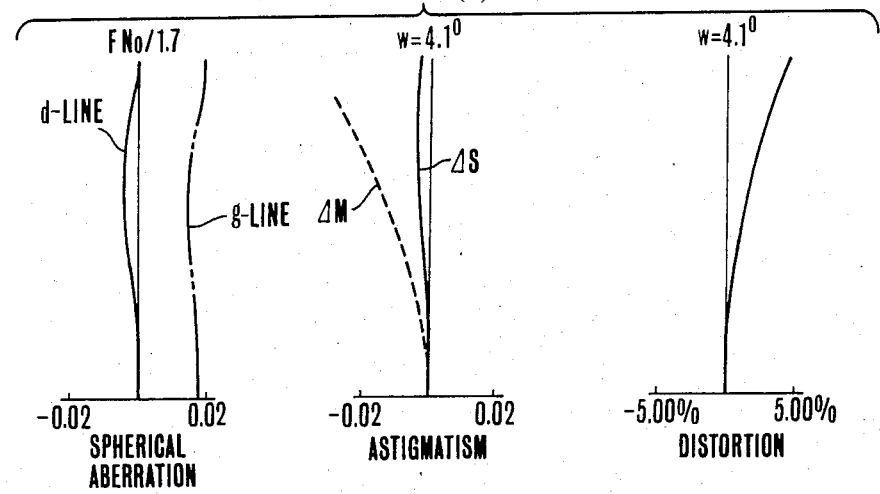
Figure 5:
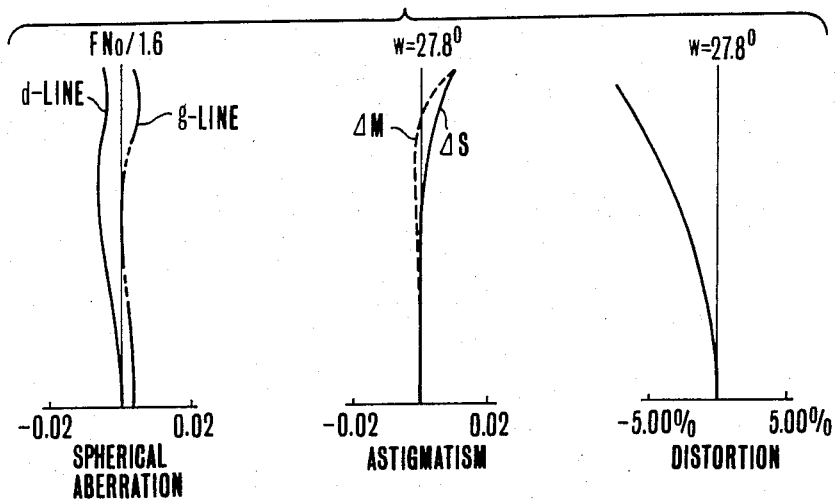
FIGS. 5(a), 5(b) and 5(c) are graphic representations of the various aberrations of the lens of FIG. 2.
Figure 5:
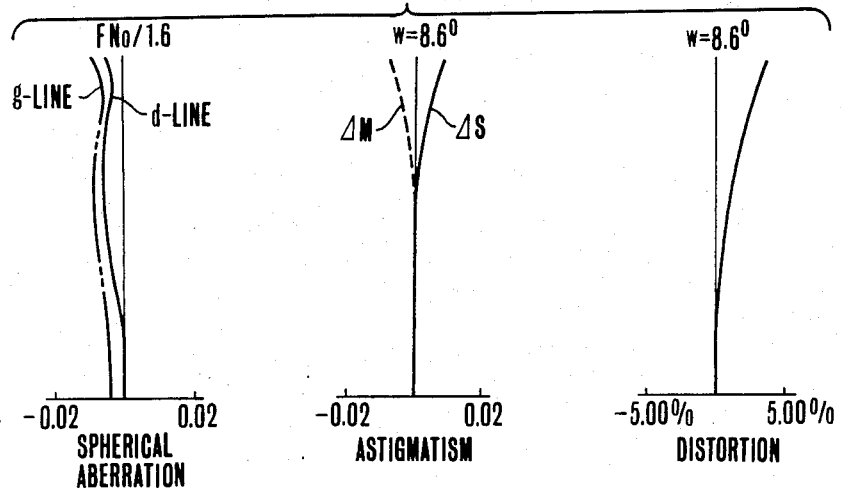
Figure 5:
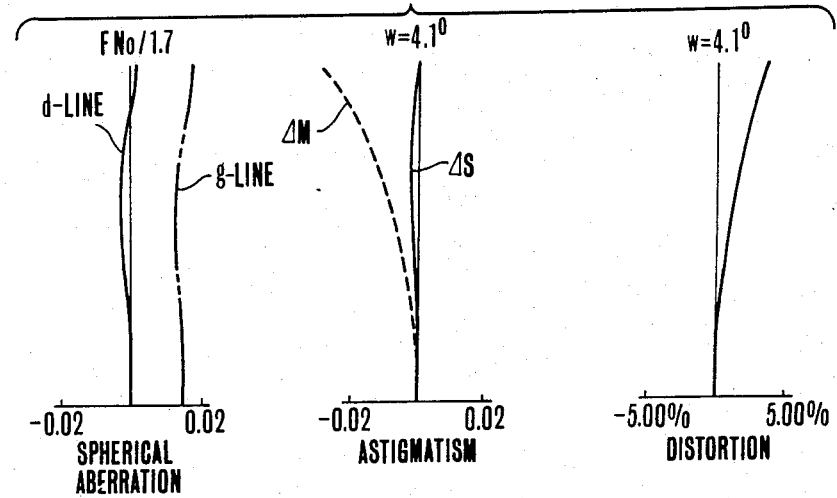

In connection with FIGS. 1 to 3 illustrating the respective specific zoom lenses it is noted that R13 represents a stop, and R28 and R29 define a face plate or filter of an image pickup tube usable with the video camera. It is also noted that in FIGS. 4(a) to 6(c) showing the various aberrations of each of the specific lenses, (a), (b) and (c) indicate that the aberrations take place in the wide angle, intermediate and telephoto positions respectively, "d" and "g" the spherical aberrations for d-line and g-line respectively, and $\Delta S$ and $\Delta M$ the sagittal and meridional image surfaces.

Also shown in Table 1 are the numerical values of the various factors in the above-stated conditions for the specific embodiments of the invention.

It should be recognized that though the foregoing embodiments of the invention has been described as having the focusing provision in the first component, focusing may be otherwise performed either by moving the front or rear group of the fourth component, or by moving the front and rear groups in unison.

Numerical Example 1

F = 1~7.329  FNO = 1:1.6  2ω = 55.6°~8.2°

| | | | |
|---|---|---|---|
| R1 = 10.825 | D1 = 0.25 | N1 = 1.80518 | ν1 = 25.4 |
| R2 = 4.544 | D2 = 0.94 | N2 = 1.60311 | ν2 = 60.7 |
| R3 = −16.371 | D3 = 0.01 | | |
| R4 = 3.929 | D4 = 0.50 | N3 = 1.62299 | ν3 = 58.2 |
| R5 = 13.856 | D5 = Variable | | |
| R6 = 28.552 | D6 = 0.11 | N4 = 1.83400 | ν4 = 37.2 |
| R7 = 1.559 | D7 = 0.43 | | |
| R8 = −1.830 | D8 = 0.10 | N5 = 1.69680 | ν5 = 55.5 |
| R9 = 2.012 | D9 = 0.31 | N6 = 1.84666 | ν6 = 23.9 |
| R10 = −17.394 | D10 = Variable | | |
| R11 = −2.568 | D11 = 0.10 | N7 = 1.69680 | ν7 = 55.5 |
| R12 = −29.890 | D12 = Variable | | |
| R13 = Stop | D13 = 0.12 | | |
| R14 = 8.365 | D14 = 0.45 | N8 = 1.69680 | ν8 = 55.5 |
| R15 = −2.733 | D15 = 0.11 | | |
| R16 = 4.576 | D16 = 0.37 | N9 = 1.60311 | ν9 = 60.7 |
| R17 = −7.340 | D17 = 0.16 | | |
| R18 = −2.513 | D18 = 0.12 | N10 = 1.84666 | ν10 = 23.9 |
| R19 = −6.504 | D19 = 0.01 | | |
| R20 = 1.808 | D20 = 0.57 | N11 = 1.58913 | ν11 = 61.0 |
| R21 = −38.918 | D21 = 1.01 | | |
| R22 = −3.414 | D22 = 0.10 | N12 = 1.83400 | ν12 = 37.2 |
| R23 = 1.291 | D23 = 0.13 | | |
| R24 = 9.168 | D24 = 0.26 | N13 = 1.49831 | ν13 = 65.0 |
| R25 = −2.033 | D25 = 0.01 | | |
| R26 = 1.490 | D26 = 0.49 | N14 = 1.51633 | ν14 = 64.1 |
| R27 = −4.647 | D27 = 0.48 | | |
| R28 = 0.0 | D28 = 0.57 | N15 = 1.51633 | ν15 = 64.1 |
| R29 = 0.0 | | | |

Back Focus (B.F.) = 0.632
Total Length of the Lens (T.L.L.) = 12.088
Distance from Image Plane to Exit Pupil (E.P.) = −9.128

| f | 1.000 | 3.494 | 7.329 |
|---|---|---|---|
| D5 | 0.123 | 2.372 | 3.113 |
| D10 | 3.338 | 0.681 | 0.278 |
| D12 | 0.281 | 0.688 | 0.351 |

Numerical Example 2

F = 1~7.329  FNO = 1:1.6  2ω = 55.6°~8.2°

| | | | |
|---|---|---|---|
| R1 = 10.798 | D1 = 0.25 | N1 = 1.80518 | ν1 = 25.4 |
| R2 = 4.553 | D2 = 0.94 | N2 = 1.60311 | ν2 = 60.7 |
| R3 = −17.370 | D3 = 0.01 | | |
| R4 = 3.807 | D4 = 0.50 | N3 = 1.62299 | ν3 = 58.2 |
| R5 = 12.848 | D5 = Variable | | |
| R6 = 11.253 | D6 = 0.11 | N4 = 1.83400 | ν4 = 37.2 |
| R7 = 1.435 | D7 = 0.43 | | |
| R8 = −1.704 | D8 = 0.10 | N5 = 1.69680 | ν5 = 55.5 |
| R9 = 2.133 | D9 = 0.31 | N6 = 1.84666 | ν6 = 23.9 |
| R10 = −11.236 | D10 = Variable | | |
| R11 = −2.656 | D11 = 0.10 | N7 = 1.69680 | ν7 = 55.5 |
| R12 = −47.928 | D12 = Variable | | |
| R13 = Stop | D13 = 0.12 | | |
| R14 = 7.725 | D14 = 0.43 | N8 = 1.69680 | ν8 = 55.5 |
| R15 = −2.808 | D15 = 0.11 | | |
| R16 = 4.605 | D16 = 0.38 | N9 = 1.60311 | ν9 = 60.7 |
| R17 = −7.355 | D17 = 0.24 | | |
| R18 = −2.415 | D18 = 0.11 | N10 = 1.84666 | ν10 = 23.9 |
| R19 = −6.245 | D19 = 0.01 | | |
| R20 = 1.875 | D20 = 0.53 | N11 = 1.58913 | ν11 = 61.0 |

-continued

Numerical Example 2

| | | | |
|---|---|---|---|
| R21 = −28.090 | D21 = 1.07 | | |
| R22 = −4.566 | D22 = 0.10 | N12 = 1.83400 | ν12 = 37.2 |
| R23 = 1.221 | D23 = 0.14 | | |
| R24 = 5.864 | D24 = 0.26 | N13 = 1.49831 | ν13 = 65.0 |
| R25 = −2.392 | D25 = 0.01 | | |
| R26 = 1.407 | D26 = 0.43 | N14 = 1.51633 | ν14 = 64.1 |
| R27 = −4.975 | D27 = 0.48 | | |
| R28 = 0.0 | D28 = 0.57 | N15 = 1.51633 | ν15 = 64.1 |
| R29 = 0.0 | | | |

B.F. = 0.642  T.L. = 12.133  E.P. = 10.663

| f | 1.000 | 3.494 | 7.329 |
|---|---|---|---|
| D5 | 0.118 | 2.367 | 3.107 |
| D10 | 3.328 | 0.672 | 0.269 |
| D12 | 0.296 | 0.704 | 0.366 |

Numerical Example 3

F = 1~7.329  FNO = 1:1.6  2ω = 55.5°~8.2°

| | | | |
|---|---|---|---|
| R1 = 10.769 | D1 = 0.25 | N1 = 1.80518 | ν1 = 25.4 |
| R2 = 4.466 | D2 = 0.94 | N2 = 1.60311 | ν2 = 60.7 |
| R3 = −14.784 | D3 = 0.01 | | |
| R4 = 3.874 | D4 = 0.50 | N3 = 1.62299 | ν3 = 58.2 |
| R5 = 12.130 | D5 = Variable | | |
| R6 = 13.356 | D6 = 0.11 | N4 = 1.83400 | ν4 = 37.2 |
| R7 = 1.459 | D7 = 0.45 | | |
| R8 = −1.694 | D8 = 0.10 | N5 = 1.69680 | ν5 = 55.5 |
| R9 = 1.913 | D9 = 0.31 | N6 = 1.84666 | ν6 = 23.9 |
| R10 = −11.460 | D10 = Variable | | |
| R11 = −2.419 | D11 = 0.10 | N7 = 1.69680 | ν7 = 55.5 |
| R12 = −17.528 | D12 = Variable | | |
| R13 = Stop | D13 = 0.16 | | |
| R14 = 56.713 | D14 = 0.42 | N8 = 1.72000 | ν8 = 50.2 |
| R15 = −2.467 | D15 = 0.11 | | |
| R16 = 4.226 | D16 = 0.45 | N9 = 1.60311 | ν9 = 60.7 |
| R17 = −4.521 | D17 = 0.09 | | |
| R18 = −2.879 | D18 = 0.12 | N10 = 1.84666 | ν10 = 23.9 |
| R19 = −12.569 | D19 = 0.01 | | |
| R20 = 1.583 | D20 = 0.59 | N11 = 1.49831 | ν11 = 65.0 |
| R21 = 13.471 | D21 = 1.28 | | |
| R22 = −2.218 | D22 = 0.10 | N12 = 1.83400 | ν12 = 37.2 |
| R23 = 1.244 | D23 = 0.16 | | |
| R24 = 5.689 | D24 = 0.32 | N13 = 1.49831 | ν13 = 65.0 |
| R25 = −1.793 | D25 = 0.01 | | |
| R26 = 1.545 | D26 = 0.53 | N14 = 1.48749 | ν14 = 70.1 |
| R27 = −2.460 | D27 = 0.48 | | |
| R28 = 0.0 | D28 = 0.57 | N15 = 1.51633 | ν15 = 64.1 |
| R29 = 0.0 | | | |

B.F. = 0.442  T.L. = 12.388  E.P. = −46.657

| f | 1.000 | 3.494 | 7.329 |
|---|---|---|---|
| D5 | 0.113 | 2.362 | 3.103 |
| D10 | 3.321 | 0.665 | 0.261 |
| D12 | 0.446 | 0.853 | 0.516 |

TABLE 1

Relationship between the Various Conditions and the Specific Embodiments of the Invention

| Condition | Factor | Embodiment 1 | 2 | 3 |
|---|---|---|---|---|
| (1) | \|fT/fII\| | 5.892 | 5.892 | 5.897 |
| (2) | RII2/fT | 0.213 | 0.195 | 0.199 |
| (3) | \|RIV3/RIV5\| | 1.821 | 1.906 | 1.468 |
| (4) | RIV7/fW | 1.808 | 1.875 | 1.583 |
| (5) | RIV10/fW | 1.291 | 1.221 | 1.244 |
| (6) | DIV4/fW | 0.16 | 0.238 | 0.089 |
| (7) | DIV8/fW | 1.011 | 1.074 | 1.284 |
| (8) | DIV10/fW | 0.127 | 0.143 | 0.164 |

What we claim:

1. A zoom lens comprising:
a first lens component having a positive refractive power for focusing the lens;
a second lens component on the image side of said first lens component and having a negative refractive power for varying the magnification power of the lens, said second lens component including, from front to rear, a negative meniscus-shaped lens having a strong refracting rear surface, and another negative meniscus-shaped lens having a strong refracting front surface and a cemented surface of forward convexity;
a third lens component on the image side of said second lens component and having a negative refractive power for compensating for the image shift resulting from the change of the magnification power; and
a fourth lens component on the image side of said third lens component and having a positive refractive power for forming an image of an object, a front group of said fourth lens component including, from front to rear, a bi-convex lens having a rear surface of strong curvature, another bi-convex lens having a front surface of strong curvature, a lens of negative power having a front surface of strong curvature and a lens of positive power having a front surface of strong curvature, and a second group of said fourth lens component including, from front to rear, a bi-concave lens having a surface of strong curvature, a bi-convex lens with a rear surface of strong curvature, and another bi-convex lens having a front surface of strong curvature.

2. A zoom lens according to claim 1, wherein in the said second lens component, RIIi denotes the radius of curvature of the i-th lens surface counting from front, fII the focal length of said second lens component, in said fourth lens component, RIVi denotes the radius of curvature of the i-th lens surface counting from the front and DIVi the i-th lens thickness or air space, and fW and fT the shortest and longest focal lengths respectively of the entire system, and said zoom lens satisfies the following conditions:

5.7 < |fT/fII| < 6.1
0.18 < RII2/fT < 0.22
1.40 < |RIV3/RIV5| < 1.95 (RIV3 > 0, RIV5 < 0)
1.5 < RIV7/fW < 1.9
1.15 < RIV10/fW < 1.3
0.07 < DIV4/fW < 0.25
0.95 < DIV8/fW < 1.35
0.12 < DIV10/fW < 0.18

3. A zoom lens as in claim 1, wherein a separation exists between the bi-concave lens and the bi-convex lens in the second group of said fourth lens component.

4. A zoom lens as in claim 2, wherein a separation exists between the bi-concave lens and the bi-convex lens in the second group of said fourth lens component.

* * * * *